UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,130,499.   Specification of Letters Patent.   Patented Mar. 2, 1915.

No Drawing.   Application filed June 23, 1911.   Serial No. 635,009.

*To all whom it may concern:*

Be it known that I, CARLETON ELLIS, a citizen of the United States, and now residing at Montclair, county of Essex, and State of New Jersey, have made certain new and useful Inventions Relating to Finish-Removers, of which the following is a specification.

This invention relates especially to finish removers comprising liquid finish solvent esters of the aromatic polycarboxylic acids, such as phthalic acid or the like preferably combined with miscible thinning finish solvent material and waxy or other stiffening material, chlorinated finish solvent material being preferably incorporated where non-inflammable removers are desired.

Many esters of the aromatic polycarboxylic acids are liquid finish solvents desirable for use in finish removers, especially in removers employed under extreme service conditions such as promote evaporation, the relatively non-volatile character of these esteric solvents also making them especially desirable for use in non-inflammable removers. Many esters of phthalic and other aromatic dicarboxylic acids are desirable in this connection such as the dymethyl phthalic ester which boils at about 280° C., the diethyl ester which boils at about 288° C., both having strong solvent action on a wide range of paint and varnish gums, resins and binders, and possessing considerable consistency so as to require the incorporation of comparatively little mechanical thickening material for remover service. The ethyl methyl ester of phthalic acid is also useful in this connection and the monomethyl and monomethyl esters may also be used in some cases. The esters of the related methyl phthalic acid, ethyl phthalic acid, dimethyl phthalic acid, for example, may also be used for some purposes and some of the esters of camphoric acid or naphthalic acid have some value in this connection, the finish solvent action of these esters being of course promoted by the incorporation of miscible thinning solvent material.

The phthalic esters may be derived from naphthalene which is a cheap and widely available raw material. The naphthalene may be chlorinated by treatment with chlorin gas or chlorinating mixtures, such as potassium chlorate and hydrochloric acid to form dichlornaphthalene which may be oxidized by the action of nitric acid to form phthalic acid. In this oxidation of dichlor naphthalene by nitric acid, electrolysis or in other ways, the action may be so regulated as to produce a mixture of phthalic acid and dichlornaphthlene, such oxidizing action being much more readily and smoothly effected than the complete conversion of the dichlornaphthalene into phthalic acid. The subsequent conversion of the acid into the desired methyl or ethyl ester, for instance, gives a mixture of the esteric solvent with dichlornaphthalene which produces relatively cheap and desirable composite solvents for remover work, the phthalic ester being preferably present therein to the extent of 50 or 80 per cent. or so. The dichlor naphthalene present in such composition finish solvent is a rather thick liquid having of itself a considerable solvent action on many paint and varnish gums and resins and if properly prepared is comparatively free from the disagreeable odor of naphthalene. It is not, however, necessary in all cases to resort to this preliminary chlorination step in producing phthalic acid from naphthalene since the naphthalene may be directly oxidized into phthalic acid by the use of such strong nitric acid as to attack and oxidize to the desired extent one ring of the naphthalene nucleus. The union of some of such polycarboxylic or other acids with alcohols and so forth, to produce remover solvents may be effected, for instance, by the passage of a suitable mixture of vapors of organic acid and alcohol over a suitable catalyzer, such as thorium oxid, titanium oxid, and so forth, heated to 350 to 500° C., or so, so as to form the corresponding ketones or esters. Carbolic acid and formic acid may be used for example, or acetic or benzoic acid with wood, grain or denatured alcohol. Other ethers of a substantially non-volatile or slowly volatile character and desirable for non-volatile remover compositions, are beta naphthol ether, guaiacol, benzyl ethers, xylyl ethers, phenol ethers and borneol ethyl ether may be used. The condensation products of formaldehyde and various ketones, such as methyl acetone in the presence of a suitable alkaline catalyst producing besides allied bodies methylketobutanol which is formed by such action on acetone, and similar condensation products may be secured by the action of formaldehyde on wood tar oils to produce remover solvents, also acetone chloroform or oxyisobutyrotrichlorid and phenyl alphaoxyisobutyrate and similar esters are desirable in some cases.

Phenyl hydrazin phenolate is also a desirable component in removers and may be formed by fusing together phenyl hydrazin and carbolic acid forming the solid compound melting at about 42 degrees and soluble in the usual remover solvents. In a benzol solution, for example, the compound is dissociated and in solution in a mixture of alcohol and benzol, the dissociation would be proportionate to the amount of benzol present. This would allow the dissociated carbolic acid to act upon paint or varnish and soften the same, but in case the composition dried on the skin of the operator the evaporation of the volatile solvents would cause reassociation of the constituents of the phenyl hydrazin phenolate, thereby minimizing undesirable action on the skin. The remover may contain in addition to such aromatic carboxylic ester solvent material suitable finish solvent material miscible therewith and preferably having a thinning action thereon so as to promote the penetration and softening or loosening action on finish. Such incorporated solvent material may comprise suitable loosening finish solvent material, that is solvents of a generally alcoholic character or action in removers such as methyl ethyl, propyl, butyl, benzyl and other strict alcohols preferably in their commercial forms, including denatured alcohol, as well as ketonic finish solvents, such as methyl ethyl ketone, oil of acetone, acetone, methyl acetone, butyrone and the like. Suitable penetrating finish solvent material may also be used, that is, solvent material of a generally benzolic character or action in removers, such as benzole and its homologues, toluol, xylol, mesitylene, cumene and so forth, and their commercial forms, such as solvent naphtha, commercial toluol and also the somewhat analogous petroleum hydrocarbons, such as naphtha, benzin and light kerosene, as well as turpentine, wood turpentine, carbontetrachlorid, trichlorethylene, penthachlorethane and other chlorinated solvents having inflammability suppressing action. It is of course understood that for non-inflammable removers the use of the more highly volatile remover solvents having inflammable vapors as in the case of methyl alcohol and acetone, should be minimized for the best results and the heavier or relatively non-volatile corresponding solvents employed.

Suitable stiffening material may be used, such as waxy evaporation retarding stiffening material, including paraffin, ceresin, ozocerite, beeswax and the like which have a correspondingly greater evaporation retarding action if the fractionated less soluble and higher melting point proportions are used, such as paraffin, fractionated by precipitation from a benzole solution by a relatively small proportion of alcohol and which has a correspondingly high melting point of 63° or 65° C. or more. One-half or even one-quarter of a per cent. of such fractionated high melting point paraffin has a highly efficient evaporation retarding action and may be used with good results in such removers, preferably in connection with other thickening material capable of the desired mechanical stiffening action so as to give the proper consistency to the composition. Celluloid, pyroxylin or other cellulose esters may be used in this connection or soapy stiffening material or inert stiffening material such as starch, whiting, infusorial earth, magnesia, wood flour and so forth.

A suitable illustrative composition may comprise 40 parts of dimethyl phthalic ester, 10 parts of dichlor naphthalene, 20 parts of ethyl or benzyl alcohol, 25 parts of trichlorethylene, 1 part of fractionated paraffin having a melting point of about 65 degrees C. and 5 parts of scrap celluloid.

Another suitable illustrative remover composition may comprise 15 parts of methyl ethyl phthalic ester, 15 parts of dichlornaphthalene, 15 parts of benzyl alcohol, 15 parts of wood tar oil, 35 parts of trichlorethylene, 1 part of ceresin, or paraffin wax, and 4 parts of celluloid.

Another suitable remover composition may comprise 35 parts of dimethyl phthalic ester, 10 parts of dichlornaphthalene, 10 parts of xylol, 30 parts of pine oil or terpineol, 10 parts of wood tar oil, 3 parts of celluloid and 2 parts of ceresin.

Another illustrative remover composition may comprise 35 parts of dimethyl phthalic ester, 60 parts of pine oil, one-quarter to one-half part of fractionated hard paraffin wax and 3 parts of celluloid.

Another illustrative remover composition may comprise 37 parts of diethyl phthalic ester, 20 parts of xylol, 40 parts of pentachlorethane and 3 parts of ceresin wax.

Another suitable illustrative remover may comprise 90 parts of dimethyl phthalic ester and 5 parts of wood tar oil and 5 parts of ceresin.

Another suitable illustrative remover may comprise 40 parts of dimethyl phthalic ester, 55 parts of toluol, 1 part of ceresin and 5 parts of celluloid.

The wax may be preferably dissolved in the more energetic solvent therefor and the celluloid or other thickener dissolved or incorporated in the more energetic solvent for such thickener where it is soluble, moderate heat being used preferably below blood heat in the case of pyroxylin to minimize undesirable coagulation. The solutions may then be mixed with vigorous stirring in an agitating tank so as to secure a homogeneous mixture which may be allowed to cool gradually while stirring continues.

Having described this invention in connection with a number of illustrative ingredients, formulas, proportions and processes, to the details of which disclosure the invention is not of course to be limited what is claimed as new is:

1. The non-inflammable finish remover comprising approximately 40 parts of dimethyl phthalic ester, 10 parts of dichlor naphthalene, 20 parts of ethyl alcohol, 25 parts of trichlorethylene, 5 parts of celluloid and 1 part of fractionated hard paraffin wax having a melting point of about 65° C.

2. The non-inflammable finish remover comprising approximately 40 parts of dimethyl phthalic ester, 10 parts of dichlornaphthalene, 20 parts of alcoholic finish solvent, 25 parts of chlorinated inflammability suppressing solvent material and incorporated stiffening material including wax and nitro-cellulose.

3. The non-inflammable finish remover comprising a large proportion of dimethyl phthalic ester, a considerable proportion of dichlor naphthalene incorporated therewith and incorporated miscible solvent material including loosening finish solvent material and chlorinated solvent and stiffening material.

4. The non-inflammable finish remover comprising a large proportion of a liquid finish solvent ester of phthalic acid, a considerable proportion of dichlor naphthalene and incorporated finish solvent material including an inflammability suppressing solvent and incorporated stiffening material.

5. The substantially non-inflammable finish remover comprising a large proportion of a finish solvent ester of phthalic acid, an appreciable amount of dichlor naphthalene incorporated therewith and incorporated finish solvent material including an inflammability suppressing solvent.

6. The finish remover consisting in large part of a mixture of a finish solvent phthalic ester and dichlornaphthalene and incorporated miscible finish solvent material.

7. The finish remover consisting in considerable part of a liquid finish solvent ester of phthalic acid and an appreciable amount of dichlornaphthalene incorporated therewith and incorporated miscible finish solvent material.

8. The finish remover comprising a considerable proportion of a mixture of a liquid finish solvent phthalic ester and of dichlornaphthalene present to the extent of more than fifteen per cent. of the phthalic ester, and incorporated finish solvent material.

9. The finish remover comprising a liquid finish solvent methyl ester of phthalic acid and incorporated dichlornaphthalene to the extent of more than fifteen per cent. of said phthalic ester.

10. The finish remover consisting in considerable part of a liquid finish solvent ester of an aromatic dicarboxylic acid incorporated with a considerable proportion of dichlornaphthalene and incorporated miscible thinning material.

11. The finish remover consisting to the extent of 10% or more of a liquid finish solvent ester of an aromatic polycarboxylic acid and incorporated miscible thinning finish solvent material.

12. The finish remover consisting to the extent of 10% or more of a finish solvent ester of an aromatic polycarboxlyic acid, incorporated miscible finish solvent material including a loosening finish solvent and incorporated evaporation retarding stiffening material.

13. The finish remover consisting to the extent of 5% or more of a liquid finish solvent ester of phthalic acid and incorporated miscible thinning finish solvent material.

14. The finish remover consisting to the extent of 5% or more of a liquid finish solvent methyl ester phthalic acid and incorporated miscible thinning finish solvent material.

15. The finish remover comprising dimethyl phthalic ester, incorporated finish solvent material and incorporated stiffening material.

16. The finish remover comprising a finish solvent methyl ester of an aromatic polycarboxylic acid, incorporated finish solvent material and incorporated stiffening material.

17. The substantially non-inflammable finish remover comprising a considerable proportion of a liquid finish solvent phthalic ester, incorporated miscible finish solvent material and incorporated waxy stiffening material.

18. The substantially non-inflammable finish remover comprising a considerable proportion of a liquid finish solvent methyl ester of an aromatic polycarboxylic acid, incorporated miscible finish solvent material and stiffening material.

CARLETON ELLIS.

Witnesses:
HARRY L. DUNCAN,
JESSIE B. KAY.